United States Patent [19]

Shaheen

[11] 3,962,112

[45] June 8, 1976

[54] COMPOSITION AND PROCESS FOR REMOVING SULFUR DIOXIDE FROM COMBUSTION GASES

[76] Inventor: Charles William Shaheen, 1074 Highland Ave., St. Albans, W. Va. 25177

[22] Filed: Aug. 26, 1974

[21] Appl. No.: 500,653

[52] U.S. Cl. .............................. 252/187 R; 55/73; 252/95; 423/242
[51] Int. Cl.² .................. C01B 17/56; B01D 53/34
[58] Field of Search ................. 252/187 R, 95, 102, 252/104; 55/73; 162/51, 67; 8/108.5; 423/242

[56] References Cited
UNITED STATES PATENTS

| | | | |
|---|---|---|---|
| 1,649,701 | 11/1927 | Jodeck | 55/73 |
| 2,263,948 | 11/1941 | Halvorson et al. | 252/102 X |
| 2,338,268 | 1/1944 | Stossel et al. | 8/108.5 |
| 2,481,240 | 9/1949 | Rapson et al. | 8/108.5 |
| 2,900,219 | 8/1959 | Waibel | 252/102 X |
| 3,143,402 | 8/1964 | Hervert et al. | 55/73 X |
| 3,172,725 | 1/1961 | Rugh | 55/73 X |
| 3,389,971 | 6/1967 | Alliger | 55/73 X |
| 3,560,389 | 2/1971 | Hunting | 252/95 |
| 3,574,562 | 4/1971 | Kawahata | 55/73 X |
| 3,728,266 | 4/1973 | Komeda et al. | 252/95 |

*Primary Examiner*—Benjamin R. Padgett
*Assistant Examiner*—David Leland
*Attorney, Agent, or Firm*—Francis A. Keegan

[57] ABSTRACT

A process and composition for removing sulfur dioxide from combustion gases particularly those emitted from the burning of high sulfur coal. The gases are treated with a liquid composition comprising 1 to 10 pounds of $ClO_2$ per hundred pounds of $SO_2$ to be treated and from 5 to 40 pounds of detergent per pound of $ClO_2$. The composition is preferably alkaline, and may be injected as an atomized spray into the stack carrying gases, to preferably produce a stack gas of a pH between 7.0 and 7.5. The composition may also include 0.1 to 40 pounds of alkali per pound of $ClO_2$ and 0.1 to 20 pounds of ammonia per pound of $ClO_2$. Additionally, 1 to 30 pounds of an organic solvent per pound of $ClO_2$ may be added.

23 Claims, No Drawings

3,962,112

COMPOSITION AND PROCESS FOR REMOVING SULFUR DIOXIDE FROM COMBUSTION GASES

BACKGROUND OF THE INVENTION

This invention relates generally to composition and process for treating combustion gases to remove the noxious sulfur dioxide. More particularly, the present invention relates to process and composition for reducing the emission of $SO_2$ from the flue gas obtained during the combustion of sulfur-containing coal.

It is very evident in recent years that the shortage of energy sources is rapidly becoming critical. Gaseous and liquid fuels have in recent years become the principal source of energy for both industrial and private uses. Coal, the more commonly used energy source, prior to the advent of greater reliance upon the gaseous and liquid fuels has fallen into some disfavor principally due to the common presence of sulfur often in high percentages (i.e. greater than 2% by weight). When combusted, coal containing sulfur produces sulfur dioxide which if present in sufficient quantities does not meet government standards for clean air.

To avoid air pollution problems, greater commerical use has been made of the gaseous and liquid fuels while much of the great mass of coal remains unused. The shortage of gaseous and liquid fuels however has rekindled a burning interest in the use of coal as a major, if not principal, source of energy. Coal with low content of sulfur (less than 2% by weight) is actively being in order to meet the legal standards for clean air but sufficient low sulfur coal is not readily available. It is ironic that areas of the United States known to have massive deposits of coal such as Appalachia in fact must import low sulfur coal from other regions to meet the government standards because the Appalachia coal often has a high sulfur content in the range over 2% sulfur.

The advent of new reliance upon coal as a major energy source has produced a great variance in the price of coal depending upon the sulfur content. The low sulfur content coal which may be burned and produces combustion gas within the clean air requirements is approximately 1.5 to 2% by weight sulfur. This coal, not being readily available where it might be used, is considerably more expensive than the coal of approximately 3% sulfur and greater sulfur content. Quite naturally the high sulfur coal is quite inexpensive but more significantly it is readily available in huge quantities to meet the energy demands for many years to come. It is known, for instance, that prior treatments of the stack gas have been attempted but even those using a liquid additive have been found unsuccessful due to the production of a residue that must be removed or additionally treated.

To date, effective and economic means of removing sulfur from coal prior to its combustion have not been found to be practical and therefore if the high sulfur coal is to be used without polluting the air the $SO_2$ produced must be removed or at least reduced to acceptable standards.

SUMMARY OF THE INVENTION

The present invention is the discovery of a composition and method for the removal of substantial quantities of sulfur dioxide from the combustion gases derived from materials containing sulfur such as coal. The composition should be injected as an atomized spray of droplets to the stack gases to effect the safe removal of sulfur dioxide. The composition contains as the principal active ingredient 0.1 to 10 pounds of $ClO_2$ per 100 pounds of $SO_2$ to be treated and from 5 to 40 pounds of detergent per pound of $ClO_2$. The composition may also contain 0.1 to 40 pounds of alkali per pound of $ClO_2$ and have a pH between 7.0 and 7.4 to enable the stack gas emitted to be essentially neutral.

OBJECTS OF THE PRESENT INVENTION

It is a principal object of the present invention to provide a composition and process for the removal of sulfur dioxide from combustion gases principally derived from coal or other fuels.

It is also an object of the present invention to provide a composition and process for the treatment of flue gases derived from the combustion of coal having a high sulfur content.

Further object of the present invention is to provide a composition and process which enables high sulfur coal to be utilized without producing unacceptable levels of $SO_2$ which would otherwise pollute the air.

Another object of the present invention is to provide a composition and method for producing a neutral stack gas that meets government air pollution standards.

DESCRIPTION OF THE PREFERRED EMBODIMENT

The present invention will be described principally with respect to its application to coal although it should be understood that other sulfur bearing fuels such as petroleum products may be treated to remove the sulfur dioxide produced during combustion.

In coal the high sulfur content, usually greater than 2% and often in the 3% to 4% range, produces very substantial amounts of $SO_2$ during combustion. Such coal therefore, cannot be burned without polluting the air and violating government standards for clean air. It has been discovered in accordance with the present invention that the combustion gases as they are directed through a flue or stack may be treated to remove the $SO_2$ or at least substantially reduce the $SO_2$ to a limit that is not considered harmful.

The unique composition found to be capable of removing substantial quantities of the $SO_2$ from the combustion gas includes as the principal components chlorine dioxide, $ClO_2$, and a detergent preferably in an aqueous medium.

The $ClO_2$ is the principal active ingredient and operates as an oxidizing agent, it is believed, to oxidize and convert the $SO_2$ to $SO_3$ which upon contact with the moisture in the stack gas and in the treating composition ultimately forms sulfuric acid. The sulfuric acid is thereafter presumed to be converted to a harmless sulfate or other harmless material which may be recovered or passed on into the atmosphere without causing an odor problem or otherwise polluting the environment. It should be understood that the precise mechanism of how the $SO_2$ is removed from the stack gas is not entirely understood nor is the tentative explanation given any more than a suggestion of a possibility of the chemical reactions involved.

The $ClO_2$ to be effective in the composition for treating the combustion gases should be used in the amount between 0.1 and 10 pounds per 100 pounds of $SO_2$ in the stack gas. More preferably, the amount of $ClO_2$ may be between 0.3 and 1.5 pounds per 100 pounds of $SO_2$. The $ClO_2$ to be applied as an aqueous solution should contain a sufficient amount of water to disolve the composition and to permit its injection into the stack gas. The amount of water to be utilized is not critical and may vary considerably such as between 5 to 100 times the amount of $ClO_2$ present.

In combination with the $ClO_2$ is a detergent that is believed, though it is not certain, to have multiple function. The detergent aids in the oxidizing reaction by enabling the greater contact to be achieved between the $ClO_2$ and the $SO_2$. Additionally, the alkaline detergents are useful in aiding the presumed conversion of $SO_3$ to sulfate. The amount of detergent found useful in the treating composition may range from 5 to 40 pounds of detergent per pound of $ClO_2$ and more preferably the amount of detergent may be between 10 and 30 pounds per pound of $ClO_2$.

The use of the term detergent is intended to include witin its scope all commonly known detergents, soaps and synethic detergents. The organic group that constitutes the oil-soluble part of the detergent is not critical and may be derived from any of the fatty acids, sulfonated fatty acids or fatty alcohols.

Ordinary soap including the alkali salts of fatty acids such as for instance lauric or stearic, etc., are quite useful. Particularly, the sodium and potassium salts may be utilized.

The synthetic detergents including the well known anionic, cationic and nonionic detergents may be utilized. Among the anionic detergents are those sodium salts of organic sulfonates or sulfates such as sodium lauryl sulfate. The sulfonates such as the alkylaryl sulfonates and other sulfates derived from esters and amides may be found useful. Detergents of this type include sodium dodecylbenzenesulfonate and others. Nonionic detergents such are obtained by condensation of fatty acids, alcohols or amides, with ethylene oxide are useful. Typical of this grouping are the polyoxyethylated fatty acids and alcohols.

Also useful are the cationic detergents which are the quaternary ammonium halides such as for example benzethonium chloride.

As further examples of useful detergents, it may be pointed out that any of those surface-active agents described in the "Encyclopedia of Surface-Active Agents" Sisley and Wood Volume 2, 1964 may be found to be useful.

The composition of the $ClO_2$ and the detergent will be inherently alkaline. The alkalinity of the composition is important only to the extent that the normal acidity of the stack gas is preferably to be avoided. The specific pH of the composition, therefore, may vary considerably. The stack gas is preferably brought to approximate a neutral pH by the injection of the composition, both to avoid the harm that may be caused by an acidic or highly alkaline stack gas entering the atmosphere and to avoid a residue that may be left in the stack after treatment of the stack gas. For economical and efficiency reasons alone, the production of a residue is preferably to be avoided. It has been found that if the stack gas is maintained within a pH range of 7.0 to 7.5, and preferably pH 7.2 – 7.4, no residue will be formed. It should be understood that if the formation of a residue is not found to be undesirable, the stack gas may vary outside of the preferred pH range of 7.0 to 7.5, since there still will be a substantial reduction in the noxious $SO_2$ content of the stack gas.

To counteract a highly acidic stack gas, additional alkaline material may be added to the treating composition to produce the preferred neutral or slightly alkaline pH. Any relatively strong substance alkaline such as the alkalis, generally in the amount 0.1 to 40 pounds of alkali per pound of $ClO_2$ may be found useful. The most useful alkalis are the ammonium and alkali metal hydroxides and carbonates. Additionally, ammonia in the amount of 0.1 to 20 pounds per pound of $ClO_2$ may be added if desired although its addition is not necessary or critical to the achievement of the purposes of the present invention.

The combustion gases often include organic materials that may make it desirable to include in the composition an organic solvent such as one of the lower alkyl alcohols having from 3 to 8 carbon atoms such as for instance isopropyl alcohol or one of the polyhydric alcohols having 2 to 8 carbon atoms such as ethylene glycol. The use of such organic solvents is in no way critical or necessary but has been found to be useful in the presence of combustion gases having high boiling substances such as tar and the like. The amount of the organic solvent that may be present is generally from 1 to 30 pounds per pound of $ClO_2$.

The method of treating the stack gas may vary, however, the most desirable means of application includes the injection of the liquid composition directly into the flue gas substantially prior to its exit from the stack. It is also possible, though not preferable, to inject the composition directly into the firebox and still effect some reduction in the $SO_2$ content of the stack gas. The form of injection is preferably in a manner that will produce very small droplets of the liquid to provide the most intimate contact between the treating composition and the $SO_2$ of the stack gas. Conventional atomizers are useful for this purpose and have been found to be quite satisfactory.

The amount of the composition that is to be injected into the flue gas is based upon the proportion of $ClO_2$ to the amount of $SO_2$ present as will be clear in the following examples.

EXAMPLE 1

Coal having a sulfur content of between 2.9% and 3.0% was burned. It was previously calculated that from the amount of the coal burned that 157 pounds of $SO_2$ would be generated in addition to the other combustion gases during a 24-hour period. As close to the combustion area as feasible, which as tested was approximately 6 feet from the furnace, 0.9 pounds of $ClO_2$ and 24.0 pounds of sodium lauryl sulfonate in 65.1 pounds of water were injected over a 24-hour period during which time the coal was burning to produce the $SO_2$. The pH of the stack gas was about 7.4 and no residue was found. Tests were conducted in accordance with the standard test provided by the Environmental Protection Agency published in the Federal Register, Dec. 31, 1971. It was found that 79.5% of the $SO_2$ calculated to have been produced was in fact removed rendering the exiting gas well within the acceptable standards of the permissible $SO_2$ emissions.

EXAMPLE 2

A similar amount of coal as used in Example 1 calculated to produce 157 pounds of $SO_2$ in a 24-hour period was treated with 0.68 pounds of $ClO_2$ and 22 pounds of soap in 67.5 pounds of water. The mixture was injected in the form of atomized droplets into the stack gas and calculation at the exit end of the stack indicated that 75.9% of the stack indicated that 75.9% of the $SO_2$ was removed. The stack gas pH was approximately 7.2 without any residue.

EXAMPLE 3

The same amount of coal as in Example 1 was burned to produce 157 pounds of $SO_2$ during a 24-hour period. The stack gas was treated with 1.1 pounds of $ClO_2$, 2.7 pounds of sodium lauryl sulfonate, 7.2 pounds of isoproponol, 1.0 pounds of ammonia, 10.1 pounds of potassium hydroxide, 22.5 pounds of a mixture of odor-control agents including pine oil and limonene and methysalicalate and 38 pounds water. The pH was approximately 7.0 without any residue present.

It was found that there was an 81.3% reduction of the $SO_2$ in the exiting stack gas.

From the foregoing it can be readily seen that approximately 75% of the $SO_2$ produced from the coal may be removed from the stack gas. The available coal having as much as 4% sulfur therefore may be burned and the stack gas produced would have considerably less $SO_2$ produced than the average usable coal having 1.5 to 2% sulfur. This high sulfur content coal being available much more cheaply constitutes a substantial advantage from an economical standpoint but even more importantly, it enables such coal to be used when at the present time its use has been prevented.

I claim:

1. The process of removing $SO_2$ from gases emitted by the combustion of materials comprising:
   treating said gases with a liquid aqueous composition comprising,
   0.1 to 10 pounds of $ClO_2$ per 100 pounds of $SO_2$ to be treated and from 5 to 40 pounds of detergent per pound of $ClO_2$.

2. The process of claim 1 wherein the amount of $ClO_2$ is 0.3 to 1.5 pounds per 100 pounds of $SO_2$.

3. The process of claim 1 wherein the amount of detergent is 10 to 20 pounds per pound of $ClO_2$.

4. The process of claim 1 wherein the amount of $ClO_2$ is 0.3 to 1.5 pounds per 100 pounds of $SO_2$ and the amount of detergent is 10 to 20 pounds per pound of $ClO_2$.

5. The process of claim 1 including producing a pH of the stack gas of 7.0 to 7.5.

6. The process of claim 1 including spraying said composition in the form of fine droplets into said gases.

7. The process of claim 1, including said detergent being any one of the nonionic, anionic and cationic surface-active agents.

8. The process of claim 1, including said composition containing on about 0.1 to 40 pounds of alkali per pound of $ClO_2$.

9. The process of claim 1 including said composition containing about 0.1 to 20 pounds of ammonia per pound of $ClO_2$.

10. The process of claim 1 including 1 to 30 pounds of an organic solvent per pound of $ClO_2$.

11. The process of claim 1 including spraying in atomized form an aqueous solution of said composition into a stack of combustion gases.

12. The process of claim 1 wherein the material being combusted is coal having a high sulfur content.

13. The process of claim 12 including producing a pH of the stack gas of 7.0 to 7.5 and spraying in atomized form an aqueous solution of said composition into a stack of combustion gases.

14. The aqueous composition for treating combustion gases to remove $SO_2$ comprising:
    1 to 10 pounds of $ClO_2$ per 100 pounds of $SO_2$ to be treated and
    5 to 40 pounds of detergent per pound of $ClO_2$.

15. The composition of claim 14 including an aqueous solution of said composition having an alkaline pH.

16. The composition of claim 14 wherein the amount of $ClO_2$ is 0.3 to 1.5 pounds per 100 pounds of $SO_2$.

17. The composition of claim 14 wherein the amount of detergent is 10 to 20 pounds per pound of $ClO_2$.

18. The composition of claim 14 wherein the amount of $ClO_2$ is 0.3 and 1.5 pounds per 100 pounds of $SO_2$ and the amount of detergent is 10 to 20 pounds per pound of $ClO_2$.

19. The composition of claim 14 including said composition containing about 0.1 to 40 pounds of alkali per pound of $ClO_2$.

20. The composition of claim 14 including said composition containing about 0.1 to 20 pounds of ammonia per pound of $ClO_2$.

21. The composition of claim 14 including 1 to 30 pounds of an organic solvent per pound of $ClO_2$.

22. The composition of claim 18 including said composition containing about 0.1 to 40 pounds of alkali per pound of $ClO_2$.

23. The composition of claim 22 wherein said composition contains about 0.1 to 20 pounds of ammonia per pound of $ClO_2$ and 1 to 30 pounds of an organic solvent per pound of $ClO_2$.

* * * * *